(12) United States Patent
Huang

(10) Patent No.: US 8,418,716 B2
(45) Date of Patent: Apr. 16, 2013

(54) VOLUME AND PRESSURE REGULATING DEVICE FOR OXYGEN

(76) Inventor: Yu-Kang Huang, Taichung (TW)

( * ) Notice: Subject to any disclaimer, the term of this patent is extended or adjusted under 35 U.S.C. 154(b) by 217 days.

(21) Appl. No.: 13/042,530

(22) Filed: Mar. 8, 2011

(65) Prior Publication Data
US 2012/0227844 A1    Sep. 13, 2012

(51) Int. Cl.
*G05D 16/06* (2006.01)
*F16K 5/10* (2006.01)

(52) U.S. Cl.
USPC ........... 137/505.42; 137/613; 251/208

(58) Field of Classification Search .......... 137/65, 137/66, 613, 505.42; 251/208, 209
See application file for complete search history.

(56) References Cited

U.S. PATENT DOCUMENTS

| | | | | |
|---|---|---|---|---|
| 219,178 A | * | 9/1879 | Schmidt | 137/505.27 |
| 763,162 A | * | 6/1904 | Curran | 137/505.42 |
| 1,264,006 A | * | 4/1918 | Bucknam | 137/505.42 |
| 2,061,794 A | * | 11/1936 | Deming | 137/505.42 |
| 2,067,229 A | * | 1/1937 | Birch | 137/613 |
| 2,150,460 A | * | 3/1939 | Riches | 137/505.42 |
| 2,702,561 A | * | 2/1955 | Geffroy | 137/505.42 |
| 3,118,494 A | * | 1/1964 | Ward et al. | 137/505.41 |
| 3,586,037 A | * | 6/1971 | Zimmer | 137/505.42 |
| 3,812,877 A | * | 5/1974 | Fleischhacker et al. | 137/505.42 |
| 4,450,858 A | * | 5/1984 | Acomb | 137/505.42 |
| 4,643,215 A | * | 2/1987 | Phlipot et al. | 251/208 |
| 6,170,519 B1 | * | 1/2001 | Carroll et al. | 137/505.42 |
| 7,325,397 B2 | * | 2/2008 | Lee | 137/505.42 |
| 2006/0060251 A1 | * | 3/2006 | Gamard et al. | 137/613 |

* cited by examiner

*Primary Examiner* — Stephen M Hepperle
*Assistant Examiner* — Craig J Price
(74) *Attorney, Agent, or Firm* — Rosenberg, Klein & Lee

(57) ABSTRACT

A volume and pressure regulating device for an oxygen generating machine includes a body to combine a path assembly, a pressure valve assembly and a volume valve assembly within one body. The pressure valve assembly and the volume valve assembly are connected via the path assembly.

4 Claims, 7 Drawing Sheets

VOLUME AND PRESSURE REGULATING DEVICE FOR OXYGEN

FIELD OF THE INVENTION

The present invention relates to a volume and pressure regulating device, and more particularly, to an integral volume and pressure regulating device for an oxygen generating machine.

BACKGROUND OF THE INVENTION

A conventional pressure regulating device is used to regulate the input gas pressure and is disclosed in Taiwan Patent No. I230233 and generally includes a casing having an inlet which is connected to a gas source to introduce gas into the device, and an outlet for transferring pressure-regulated gas to various devices at downstream, and a regulating valve assembly which has a valve movably supported in the casing and located between an open position and a closed position. A piston assembly biases the valve to the open position when the pressure at the outlet is below a pre-set value. The piston assembly includes a pressure sensing surface which is shaped to include a long axis and a short axis. The long axis A is longer than the short axis B. The piston assembly is correspondsive to the gas pressure between the inlet and the outlet. When the pressure at the outlet is over a pre-set value, the bias pressure to the valve is reduced so as to move the valve to the closed position.

Beside the pressure regulating device to regulate the pressure of the gas, the volume of the gas is also needed, the volume regulating device is to control the volume of the gas. Taiwan Utility Model M311022 discloses a needle valve and a body of the volume regulating device, and a seal ring is located between the needle valve and the body of the volume regulating device. The needle valve of the volume regulating device includes multiple seal rings so that the machining requirement is lowered and the life of use is prolonged.

When in use, the pressure regulating device and the volume regulating device are connected by a plastic hose or a metal hose which however is easily loosened by vibration and the hose might be disconnected from the devices to shut down the whole mechanism. Furthermore, the combination of the pressure regulating device, the volume regulating device and the plastic hose or metal hose occupies too much space. If the oxygen generating machine is a medical-use device, the loosened hose could lead to a dangerous result.

The present invention intends to provide an integral volume and pressure regulating device for an oxygen generating machine so as to improve the shortcomings of the conventional ones.

SUMMARY OF THE INVENTION

The present invention relates to a volume and pressure regulating device for an oxygen generating machine and comprises a body having a top part and a bottom part which is connected to the top part. The bottom part includes a pressure regulating member and a volume regulating member. A path assembly is located within the body and the top part includes an inlet pipe, a first path, a first room, a second path and a second room located therein. The inlet pipe, the first path, the first room, the second path and the second room are in communication with each other in sequence. The inlet pipe communicates with outside of the top part and the pressure regulating member seals the first room. The volume regulating member seals the second room. The path assembly has a third path communicating with the second room. An outlet pipe has a first end connected to the third path and a second end of the outlet pipe is connected to outside of the volume regulating member. A pressure valve assembly is connected to the body and has a valve part and a control unit, wherein the valve part has a valve seat with two open ends. The first path is defined in the valve seat and a sealing ring is mounted to the valve seat. The valve seat is installed into the top part. The valve part has a first spring connected to the top part and a valve block is connected with the first spring. The valve block is located corresponding to an open end of a first end of the first path that is connected to the inlet pipe. The control unit has a bolt extending through a valve piece, a valve piece seat and a washer. A nut is connected to the bolt which is located corresponding to an open end of a second end of the first path. The control unit has a second spring connected to the pressure regulating member and contacts the valve piece seat. An adjustment rod is inserted into the pressure regulating member and contacts a washer which is in contact with the second spring. A probe is inserted into the first path and two ends of the probe respectively contact the valve block and the bolt. A volume valve assembly has a volume disk located in the second room and a rotatable member is inserted into the volume regulating member. A seal ring is mounted to the rotatable member. The volume disk and the rotatable member are fixed to the volume regulating member by extending a bolt through a washer. The volume disk has multiple passages and each passage has multiple air holes with different diameters. Three ring-shaped washers are engaged with three annular grooves of the volume regulating member. One of the three annular grooves has a through hole. The second room communicates with the passages of the volume disk, the through hole of the volume regulating member and the third path in sequence. The rotatable member has a driving rod and an adjustment portion which has axial grooves defined in the outside thereof. The volume regulating member has a recess in which a block, a third spring and a bolt are received. The block is engaged with one of the axial grooves. The volume regulating member has a notch defined in the outside of the volume disk and an O-ring is engaged with the notch.

Preferably, the second path is an L-shaped path.

Preferably, the driving rod includes a semi-circular cross section.

Preferably, an index disk is connected to the driving rod.

The primary object of the present invention is to provide an integral volume and pressure regulating device for an oxygen generating machine, so as to improve the drawback of easily loosened connection hose between the conventional volume regulating device and pressure regulating device.

Another object of the present invention is to provide an integral volume and pressure regulating device for an oxygen generating machine, so as to obtain a compact size device to save the space required.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
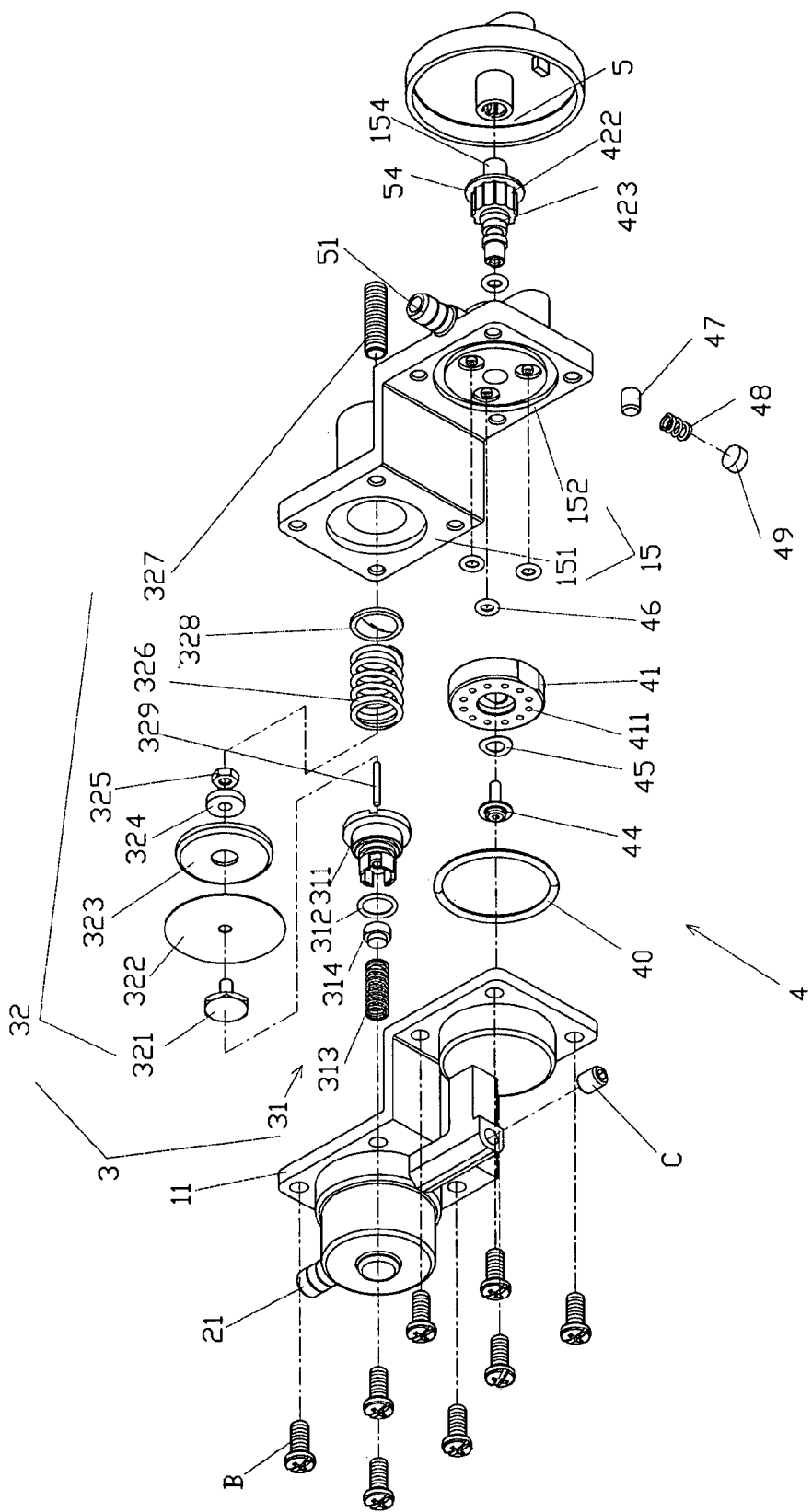
FIG. 1 is an exploded view to show the volume and pressure regulating device of the present invention.
Figure 2:
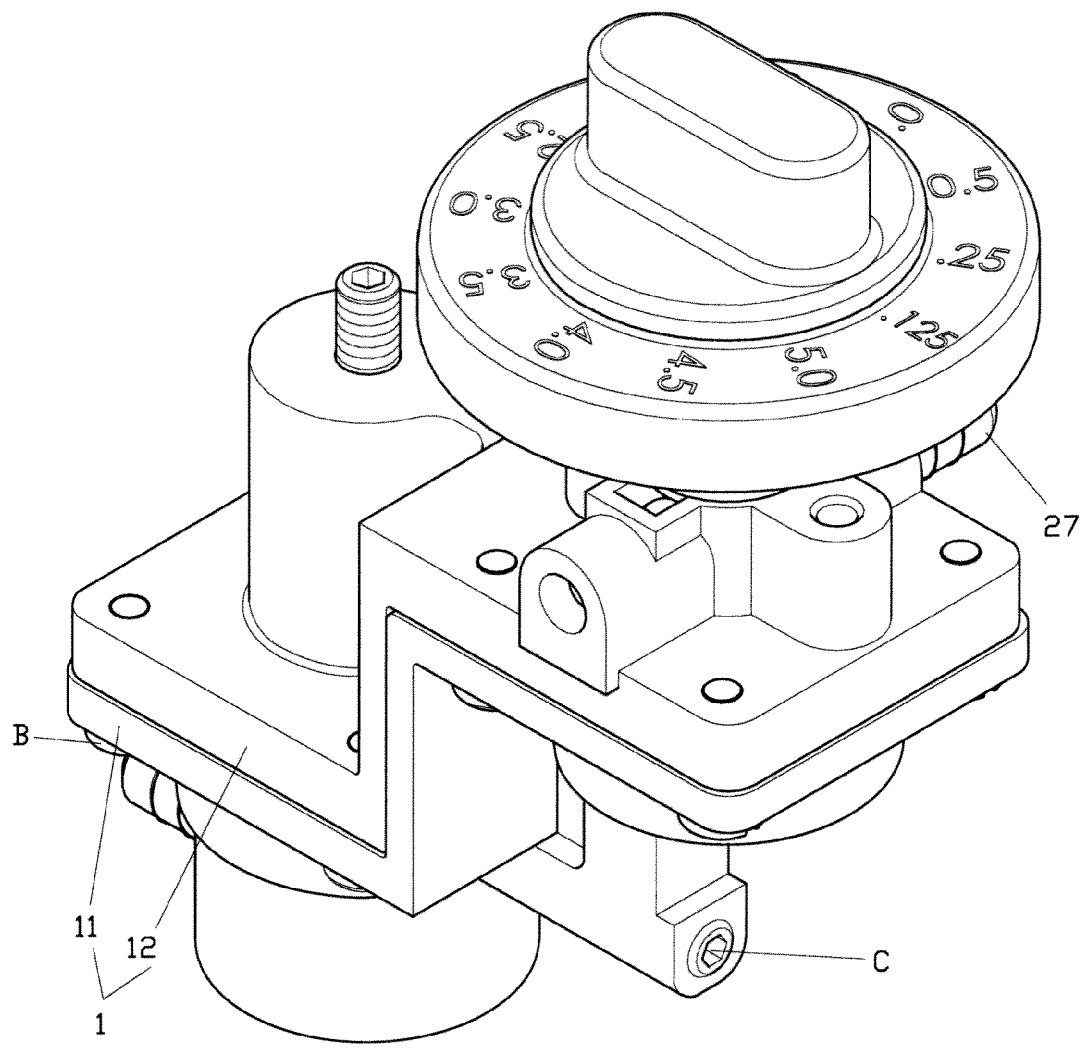
FIG. 2 is a perspective view to show the volume and pressure regulating device of the present invention.

Referring to FIGS. 1 and 2, the volume and pressure regulating device for an oxygen generating machine of the present invention comprises a body 1 including a path assembly 2, a pressure valve assembly 3 and a volume valve assembly 4 connected thereto.

The body 1 has a top part 11 and a bottom part 12 which is connected to the top part 12 by bolts "B". The bottom part 12 includes a pressure regulating member 121 and a volume regulating member 122.

Figure 3:
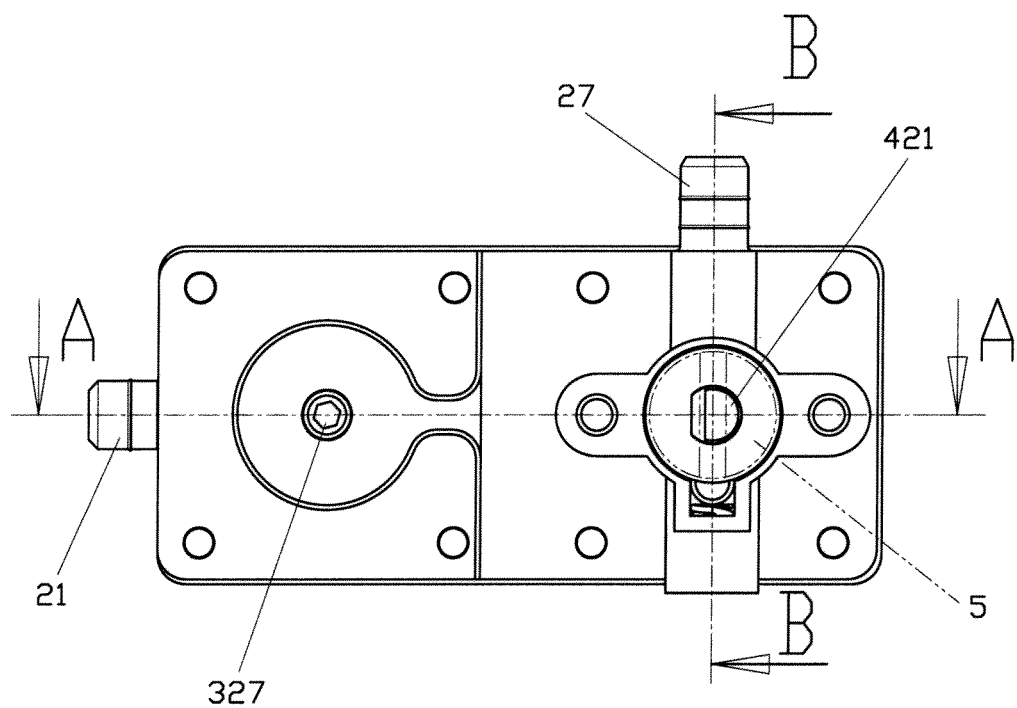
FIG. 3 is a top view of the volume and pressure regulating device of the present invention.
Figure 4:
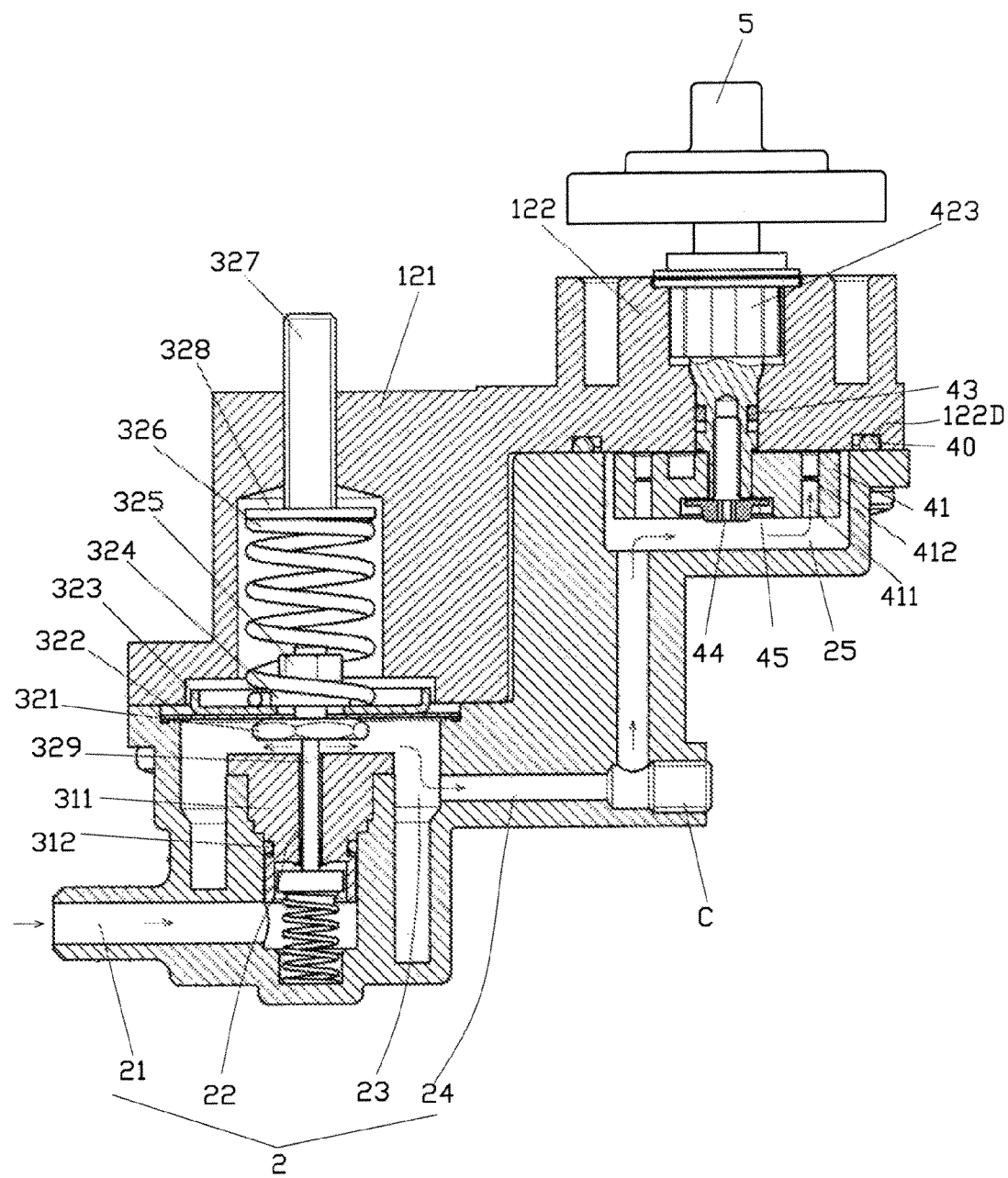
FIG. 4 is a cross-sectional view, taken along line A-A of FIG. 3 to show that oxygen enters into the device via the inlet pipe.
Figure 6:
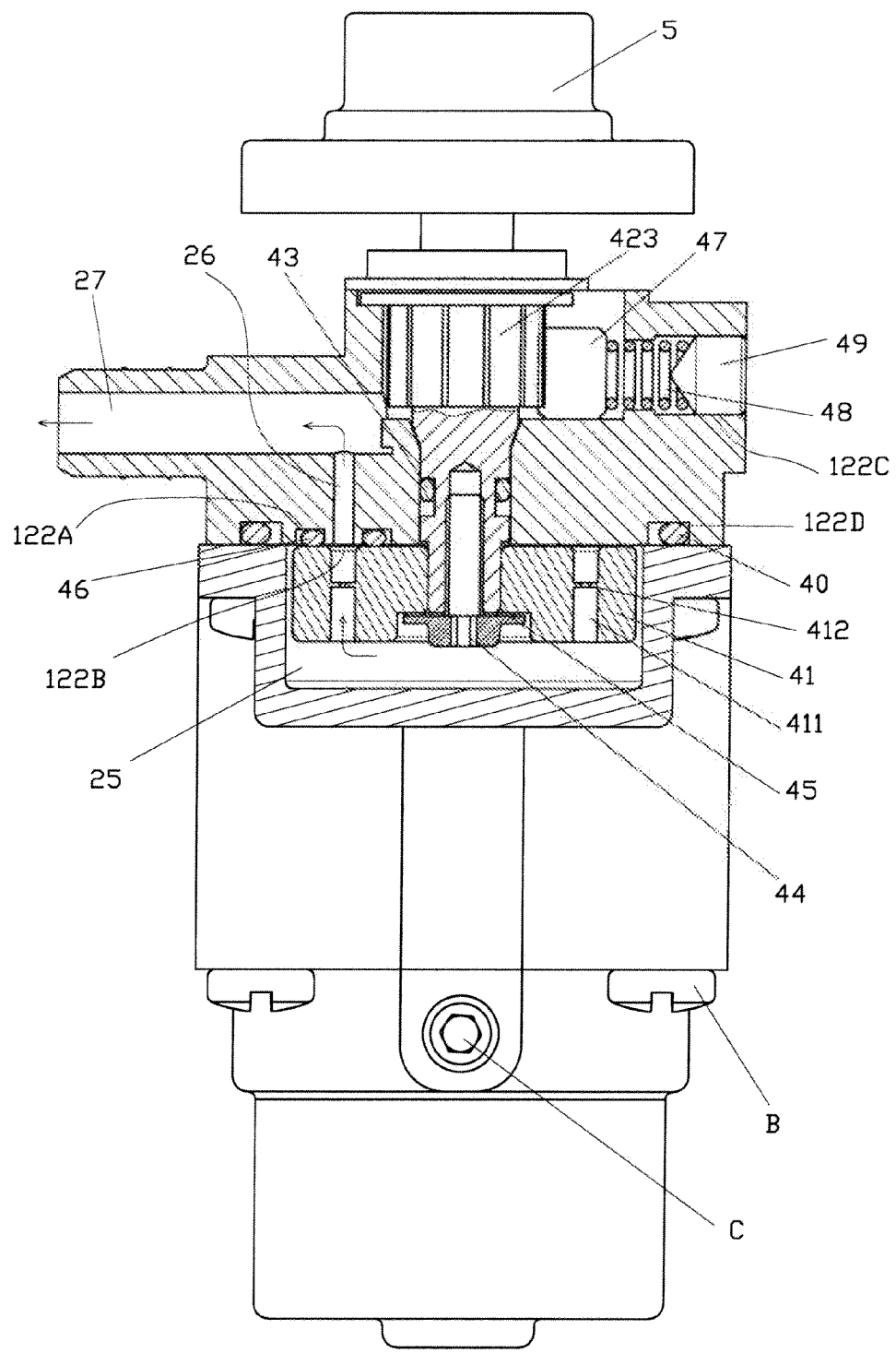
FIG. 6 is a cross-sectional view, taken along line B-B of FIG. 3 to show that oxygen leaves from the device via the outlet pipe.

As shown in FIGS. 3, 4 and 6, the path assembly 2 is located within the body 1. The top part 11 includes an inlet pipe 21, a first path 22, a first room 23, a second path 24 and a second room 25 located therein. The inlet pipe 21, the first path 22, the first room 23, the second path 24 and the second room 25 are in communication with each other in sequence. The inlet pipe 21 communicates with the outside of the top part 11 and the pressure regulating member 121 seals the first room 23. The volume regulating member 122 seals the second room 25. The path assembly 2 has a third path 26 communicating with the second room 25. An outlet pipe 27 has a first end connected to the third path 26 and a second end of the outlet pipe 27 is connected to outside of the volume regulating member 122. The second path 24 is an L-shaped path. In order to make the L-shaped second path 24, a hole is drilled in the top part 11 and an end piece "C" is engaged with the hole.

The pressure valve assembly 3 is connected to the body 1 and has a valve part 31 and a control unit 32. The valve part 31 has a valve seat 311 with two open ends. The first path 22 is defined in the valve seat 311 and a sealing ring 312 is mounted to the valve seat 311. The valve seat 311 is installed into the top part 11. The valve part 31 has a first spring 313 connected to the top part 11 and a valve block 314 is connected with the first spring 313. The valve block 314 is located corresponding to an open end of a first end of the first path 22 that is connected to the inlet pipe 21. The control unit 32 has a bolt 321 extending through a valve piece 322, a valve piece seat 323 and a washer 324, and a nut 325 is connected to the bolt 321 to secure the valve piece 322, the valve piece seat 323 and the washer 324. The bolt 321 is located corresponding to an open end of a second end of the first path 22. The control unit 32 has a second spring 326 connected to the pressure regulating member 121 and contacts the valve piece seat 323. An adjustment rod 327 is inserted into the pressure regulating member 121 and contacts a washer 328 which is in contact with the second spring 326. A probe 329 is inserted into the first path 22 and two ends of the probe 329 respectively contact the valve block 314 and the bolt 321.

The volume valve assembly 4 has a volume disk 41 located in the second room 25 and a rotatable member 42 is inserted into the volume regulating member 122. A seal ring 43 is mounted to the rotatable member 42. The volume disk 41 and the rotatable member 42 are fixed to the volume regulating member 122 by extending a bolt 44 through a washer 45. The volume disk 41 has multiple passages 411 and each passage 411 has multiple air holes 412 with different diameters. Three ring-shaped washers 46 are engaged with three annular grooves 122A of the volume regulating member 122. One of the three annular grooves 122A has a through hole 122B. The second room 25 communicates with the passages 411 of the volume disk 41, the through hole 122B of the volume regulating member 122 and the third path 26 in sequence. The rotatable member 42 has a driving rod 421 and an adjustment portion 422 which has axial grooves 423 defined in the outside thereof. The volume regulating member 122 has a recess 122C in which a block 47, a third spring 48 and a bolt 49 are received. The block 47 is engaged with one of the axial grooves 423. The driving rod 421 includes a semi-circular cross section and an index disk 5 is connected to the driving rod 421. The volume regulating member 122 includes a notch 122D defined in the outside of the volume disk 41 and an O-ring 40 is engaged with the notch 122D.

Figure 5:
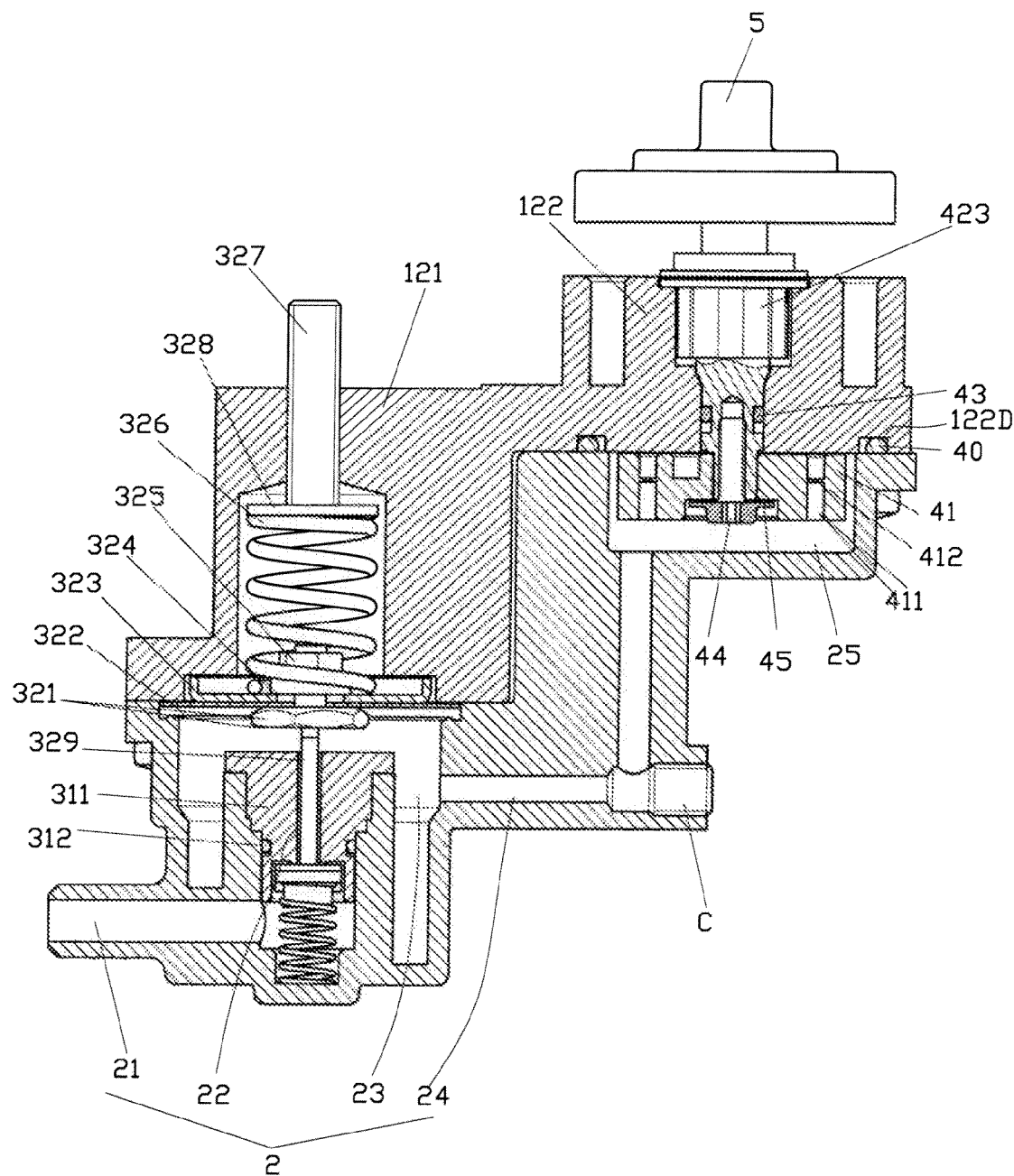
FIG. 5 is a cross-sectional view, taken along line A-A of FIG. 3 to show that the valve block seals the first path.

As shown in FIGS. 4 and 5, the adjustment rod 327 is rotated into the pressure regulating member 121 to press the second spring 326 to allow the bolt 321 to push the probe 329 upward. The probe 329 then pushes the valve block 314 to compress the first spring 313 so that the first path 22 and the inlet pipe 21 are in communication with each other to introduce oxygen therein. When the oxygen enters the first room 23 via the first path 22, a pressure is applied to the valve piece 322. When the sum of the pressure applied to the first spring 313 and the pressure of the working pressure is larger than force of the second spring 326, the valve piece 322 compresses the second spring 326 downward and releases the force from the first spring 313. Therefore, the valve block 314 pushes the probe 329 to allow the valve block 314 to seal the first path 22, such that the pressure of the oxygen is regulated. The oxygen then enters into the second room 25 via the second path 24. When the oxygen passes through the second path 24, the pressure applied to the valve piece 322 is reduced and the bolt 321 pushes the probe 329 upward to communicate the first path 22 and the inlet pipe 21. By repeated operation of the above processes, the operators can control the adjustment rod 327 to compress the second spring 326 to adjust the output pressure of the oxygen.

Figure 7:
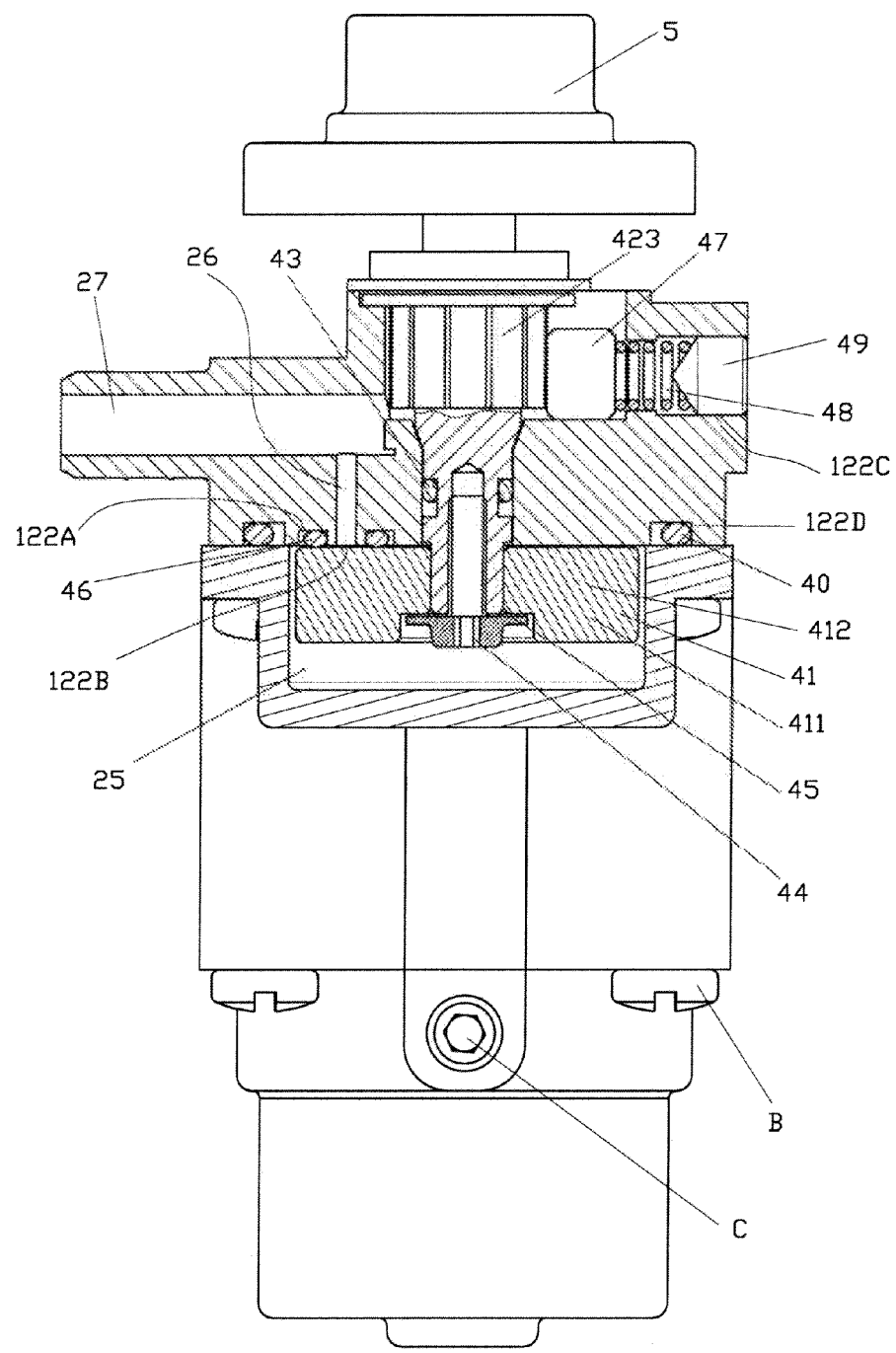
FIG. 7 is a cross-sectional view, taken along line B-B of FIG. 3 to show that the volume of oxygen is adjusted.

As shown in FIGS. 6 and 7, when the oxygen enters into the second room 25, the oxygen passes through the passages 411 of the volume disk 41, the through hole 122B of the volume regulating member 122 and the third path 26, and then releases from the outlet pipe 27. When the oxygen enters into the second room 25, the flow of the oxygen hits the volume disk 41 and the ring-shaped washers 46 absorb the impact force to reduce the vibration to the whole mechanism. The operators may rotate the index disk 5 to let the rotatable member 42 to drive the volume disk 41, so that the passages 411 are located corresponding to the through hole 122B of the volume regulating member 122. By the different diameters of the air holes 412, the volume of the oxygen can be controlled. The block 47 is movable in the axial grooves 423 of the adjustment portion 422 of the rotatable member 42 to compress the third spring 48 and the return force of the third spring 48 to reciprocally move the block 47 between the different axial grooves 423 to control the volume of the oxygen step by step.

By the way above to control the pressure and the volume of the oxygen, the processes of work are stable. The pressure valve assembly 3 and the volume valve 4 are combined into the body 1 to reduce the size of the mechanism so that less space is required.

While we have shown and described the embodiment in accordance with the present invention, it should be clear to those skilled in the art that further embodiments may be made without departing from the scope of the present invention.

What is claimed is:

1. A volume and pressure regulating device for an oxygen generating machine, comprising:

a body having a top part and a bottom part which is connected to the top part, the bottom part including a pressure regulating member and a volume regulating member;

a path assembly located within the body and the top part including an inlet pipe, a first path, a first room, a second path and a second room located therein, the inlet pipe, the first path, the first room, the second path and the second room being in communication with each other n sequence, the inlet pipe communicating with outside of the top part and the pressure regulating member sealing the first room, the volume regulating member sealing the second room, the path assembly having a third path communicating with the second room, an outlet pipe having a first end connected to the third path and a second end of the outlet pipe connected to outside of the volume regulating member;

a pressure valve assembly connected to the body and having a valve part and a control unit, the valve part having a valve seat with two open ends, the first path defined in the valve seat and a sealing ring mounted to the valve seat, the valve seat being installed into the top part, the valve part having a first spring connected to the top part and a valve block connected with the first spring, the valve block located corresponding to an open end of a first end of the first path that is connected to the inlet pipe, the control unit having a bolt extending through a valve piece, a valve piece seat and a washer, a nut connected to the bolt, the bolt located corresponding to an open end of a second end of the first path, the control unit having a second spring connected to the pressure regulating member and contacting the valve piece seat, an adjustment rod inserted into the pressure regulating member and contacting a washer which is in contact with the second spring, a probe inserted into the first path and two ends of the probe respectively contacting the valve block and the bolt, and a volume valve assembly having a volume disk located in the second room and a rotatable member inserted into the volume regulating member, a seal ring mounted to the rotatable member, the volume disk and the rotatable member being fixed to the volume regulating member by extending a bolt through a washer, the volume disk having multiple passages and each passage having multiple air holes with different diameters, three ring-shaped washers engaged with three annular grooves of the volume regulating member, one of the three annular grooves having a through hole, the second room communicating with the passages of the volume disk, the through hole of the volume regulating member and the third path in sequence, the rotatable member having a driving rod and an adjustment portion which has axial grooves defined in an outside thereof, the volume regulating member having a recess in which a block, a third spring and a bolt are received, the block engaged with one of the axial grooves, the volume regulating member having a notch defined in an outside of the volume disk and an O-ring engaged with the notch.

2. The device as claimed in claim 1, wherein the second path is an L-shaped path.

3. The device as claimed in claim 1, wherein the driving rod includes a semi-circular cross section.

4. The device as claimed in claim 3, wherein an index disk is connected to the driving rod.

* * * * *